(12) United States Patent
Dow

(10) Patent No.: US 12,157,382 B2
(45) Date of Patent: Dec. 3, 2024

(54) ELECTRIC VEHICLE CHARGING SYSTEM AND METHOD

(71) Applicant: HYUNDAI MOBIS CO., LTD., Seoul (KR)

(72) Inventor: Young Soo Dow, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 276 days.

(21) Appl. No.: 17/696,317

(22) Filed: Mar. 16, 2022

(65) Prior Publication Data

US 2022/0203853 A1  Jun. 30, 2022

Related U.S. Application Data

(63) Continuation of application No. 16/791,886, filed on Feb. 14, 2020, now Pat. No. 11,292,351.

(30) Foreign Application Priority Data

Feb. 15, 2019 (KR) .................. 10-2019-0018257

(51) Int. Cl.
| H02J 7/00 | (2006.01) |
| B60L 50/60 | (2019.01) |
| B60L 53/22 | (2019.01) |
| B60L 53/30 | (2019.01) |
| B60L 53/66 | (2019.01) |
| B60L 58/12 | (2019.01) |
| H02J 7/02 | (2016.01) |
| H02J 7/14 | (2006.01) |
| H04B 3/54 | (2006.01) |
| H04L 12/40 | (2006.01) |

(52) U.S. Cl.
CPC ............ B60L 53/22 (2019.02); B60L 50/66 (2019.02); B60L 53/32 (2019.02); B60L 53/66 (2019.02); B60L 58/12 (2019.02); H02J 7/00036 (2020.01); H02J 7/0048 (2020.01); H02J 7/02 (2013.01); *B60L 2210/30* (2013.01); *H04B 3/54* (2013.01); *H04L 12/40013* (2013.01)

(58) Field of Classification Search
CPC .......... B60L 53/22; B60L 53/32; B60L 53/66; B60L 53/30; B60L 53/14; B60L 53/16; B60L 53/18; B60L 53/34; B60L 58/12
USPC ........................................................ 320/109
See application file for complete search history.

(56) References Cited

U.S. PATENT DOCUMENTS

| 6,917,181 B2 | 7/2005 | Emori et al. |
| 8,441,228 B2 | 5/2013 | Brabec |
| 2004/0135545 A1 | 7/2004 | Fowler et al. |
| 2008/0136374 A1 | 6/2008 | Nelson et al. |
| 2009/0184833 A1* | 7/2009 | Tonegawa ............... B60L 53/62 340/636.2 |

(Continued)

FOREIGN PATENT DOCUMENTS

| KR | 10-2017-0091385 A | 8/2017 |
| KR | 10-2017-0116839 A | 10/2017 |
| KR | 10-2018-0005106 A | 1/2018 |

*Primary Examiner* — Alexis B Pacheco
(74) *Attorney, Agent, or Firm* — NSIP Law

(57) ABSTRACT

Provided is a charging system for an electric vehicle, the charging system including: provides an electric vehicle charging system capable of simultaneously satisfying unidirectional charging and bidirectional charging with protocol standards that allow a communication interface with AC slow charging equipment and DC fast charging equipment.

4 Claims, 15 Drawing Sheets

(56) References Cited

U.S. PATENT DOCUMENTS

| | | | |
|---|---|---|---|
| 2009/0278492 A1* | 11/2009 | Shimizu | H02J 7/0048 |
| | | | 320/108 |
| 2010/0060239 A1 | 3/2010 | Lundqvist et al. | |
| 2011/0204851 A1 | 8/2011 | Manotas, Jr. | |
| 2012/0098488 A1* | 4/2012 | Ichikawa | B60L 53/14 |
| | | | 320/109 |
| 2012/0249065 A1* | 10/2012 | Bissonette | B60L 53/665 |
| | | | 320/109 |
| 2012/0268078 A1 | 10/2012 | Kajouke et al. | |
| 2013/0057200 A1 | 3/2013 | Potts et al. | |
| 2013/0093393 A1* | 4/2013 | Shimotani | G01C 21/3469 |
| | | | 320/109 |
| 2014/0247019 A1* | 9/2014 | Park | B60L 3/04 |
| | | | 320/160 |
| 2014/0253085 A1 | 9/2014 | Kao et al. | |
| 2017/0166073 A1* | 6/2017 | Park | B60L 53/60 |
| 2018/0009325 A1 | 1/2018 | Jang et al. | |
| 2018/0056797 A1* | 3/2018 | Cao | H01R 13/641 |
| 2018/0201147 A1* | 7/2018 | Shin | H04L 12/10 |
| 2020/0122594 A1* | 4/2020 | Ichikawa | B60L 53/16 |

* cited by examiner

PRIOR ART
FIG. 2A

| FROM | TO | ID | TIMING | BYTE | BIT | DATA |
|---|---|---|---|---|---|---|
| BMS | FAST EVSE | BMS (0X100) | 100ms | 0 | 0 | CF_BMS_RDYFOROCS |
| | | | | | 1 | CF_BMS_WRNFOROCS |
| | | | | | 2 | CF_BMS_FAULTFOROCS |
| | | | | | 3 | CF_BMS_OCRLYONSTATFOROCS |
| | | | | | 4 | RESERVED |
| | | | | | 5 | RESERVED |
| | | | | | 6 | CF_BMS_ABNORCHG |
| | | | | | 7 | CF_BMS_OCCHAFNSHED |
| | | | | 1 | 8 | CF_BMS_SOCFOROC |
| | | | | 2 | 16 | CF_BMS_CHGREMANEDTIME |
| | | | | 3 | 24 | |
| | | | | 4 | 32 | CF_BMS_OCCMDURR |
| | | | | 5 | 40 | |
| | | | | 6 | 48 | CF_BMS_OCCMDVOLT |
| | | | | 7 | 56 | |

PRIOR ART
FIG. 2B

| DESCRIPTON |
|---|
| READY STATE (CAN COMMUNICATION PREPARATION) |
| WARNING STATE (FAULT EXCEPT FOR EVSE) |
| FAULTY STATE (FAULT) |
|  |
|  |
|  |
| CHARGING STATE (0: NORMAL, 1: ABNORMAL) |
| CHARGE FINISHED STATE |
| SOC |
| CHARGE REMAINING TIME |
| CONSTANT CURRENT VALUE |
| CONSTANT VOLTAGE VALUE |

PRIOR ART
FIG. 2C

| FROM | TO | ID | TIMING | BYTE | BIT | DATA |
|---|---|---|---|---|---|---|
| FAST EVSE | BMS | EVSE (0X200) | 100ms | 0 | 0 | CR_AC_CODE |
| | | | | 4 | 32 | CR_EVSE_CANVER |
| | | | | 5 | 40 | |
| | | | | 6 | 48 | RESERVED |
| | | | | 7 | 56 | RESERVED |
| | | EVSE (0X201) | 100ms | 0 | 0 | CF_EVSE_RDY |
| | | | | | 1 | CF_EVSE_WRN |
| | | | | | 2 | CF_EVSE_FLT |
| | | | | | 3 | CR_EVSE_MAXPWR |
| | | | | | 4 | |
| | | | | | 5 | RESERVED |
| | | | | | 6 | CF_EVSE_CHGRNSHED |
| | | | | | 7 | CF_EVSE_POWERSTAT |
| | | | | 1 | 8 | CR_EVSE_FLTCODE |
| | | | | 2 | 16 | CR_EVSE_MAXPWR |
| | | | | 3 | 24 | |
| | | | | 4 | 32 | CR_EVSE_MAXCURR |
| | | | | 5 | 40 | |
| | | | | 6 | 48 | CR_EVSE_MAXVOLT |
| | | | | 7 | 56 | |

PRIOR ART
FIG. 2D

| DESCRIPTON |
|---|
| CHARGER CODE, POSITION |
| CAN PROTOCOL |
|  |
|  |
| READY STATE |
| WARNING (EXCEPT EVSE FAULT) |
| FAULT (EVSE FAULT) |
| CHARGING MODE (CC,CV,CP) |
|  |
| CHARGE FINISHED |
| CHARGEABLE READY STATE |
| CHARGING FAULT CODE |
| MAXIMUM CHARGABLE POWER |
| MAXIMUM CHARGABLE CURRENT |
| MAXIMUM CHARGABLE VOLTAGE |

FIG. 4A

| FROM | TO | ID | TIMING | BYTE | BIT | DATA |
|---|---|---|---|---|---|---|
| OBC | BMS | OBC (0X400) | 100ms | 0 | 0 | CR_EVSESOSTAT |
| | | | | 1 | 2 | CF_EVSE_TRANSFERTYPE |
| | | | | 2 | 16 | CF_OBC_CHGFNSHED |
| | | | | | 17 | CF_EVSE_CHGFNSHED |
| | | | | | 18 | CR_EVSESTATUS |
| | | OBC (0X401) | 100ms | 0 | 0 | CR_MAXVOLT |
| | | | | 1 | 8 | |
| | | | | 2 | 16 | CR_MAXCUR |
| | | | | 3 | 24 | |
| | | | | 4 | 32 | CR_OUTVOLT |
| | | | | 5 | 40 | |
| | | | | 6 | 48 | CR_OUTCUR |
| | | | | 7 | 56 | |

FIG. 4B

| DESCRIPTON |
|---|
| 0: UNIDENTIFIED, 1: STABLE, 2: WARNING, AND 3: FAULTY |
| 0: SINGLE PHASE, 1: THREE PHASE, 2: DC, AND 3: DC COMBO |
| CHARGE FINISHED |
| EVSE CHARGING FINISHED |
| EVSE STATUS |
| MAXIMUM VOLTAGE |
| MAXIMUM CURRENT |
| OUTPUT VOLTAGE |
| OUTPUT CURRENT |

FIG. 5A

| FROM | TO | ID | TIMING | BYTE | BIT | DATA |
|---|---|---|---|---|---|---|
| OBC | EVSE | OBC (0X500) | 100ms | 0 | 0 | CR_OBC_PROCEDURE |
| | | | | 1 | 8 | CR_OBC_PROCEDURE_ERR |
| | | | | 2 | 16 | CF_OBC_RCQ |
| | | | | | 17 | CF_OBC_RDY |
| | | | | | 18 | CR_OBC_CHGCOMPLETE |
| | | OBC (0X501) | 100ms | 0 | 0 | CR_OBC_MAXCUR |
| | | | | 1 | 8 | |
| | | | | 2 | 16 | CR_OBC_MAXVOLT |
| | | | | 3 | 24 | |
| | | | | 4 | 32 | CR_OBC_TARGETCUR |
| | | | | 5 | 40 | |
| | | | | 6 | 48 | CR_OBC_TARGETVOLT |
| | | | | 7 | 56 | |
| | | OBC (0X502) | 100ms | 0 | 0 | CR_OBC_SOCREMANEDTIME |
| | | | | 1 | 8 | |
| | | | | 2 | 16 | CR_TARGET_SOC |
| | | | | 3 | 24 | CR_BOC_SOC |

FIG. 5B

| DESCRIPTON |
| --- |
| START PROCEDURE INITIATION |
| START ERROR |
| STATE REQUEST |
| READY STATE |
| CHARGING COMPLETION |
| MAXIMUM CURRENT |
| MAXIMUM VOLTAGE |
| TARGET CURRENT |
| TARGET VOLTAGE |
| REMAINING TIME |
| TARGET SOC |
| SOC STATE |

FIG. 6A

| FROM | TO | ID | TIMING | BYTE | BIT | DATA |
|------|----|----|--------|------|-----|------|
| EVSE | OBC | OBC (0X503) | 100ms | 0 | 0 | CR_EVSE_RESPONSECODE |
| | | | | 1 | 8 | CR_EVSE_PROCESSNG |
| | | | | | 9 | CF_EVSE_RESPONSE |
| | | | | | 10 | CF_EVSE_VOLTLIMIT |
| | | | | | 11 | CF_EVSE_CURLIMIT |
| | | OBC (0X504) | 100ms | | 12 | CF_EVSE_PWLIMIT |
| | | | | | 13 | CF_EVSESOSTAT |
| | | | | | 15 | CR_EVSETATUS |
| | | | | 2 | 16 | CR_EVSE_TRANSFERTYPE |
| | | | | 3 | 24 | CR_EVSE_PROFLE |
| | | | | 4 | 32 | CR_EVSE_RDY |
| | | | | | 33 | CR_EVSE_WRN |
| | | | | | 34 | CR_EVSE_FLT |
| | | | | | 35 | CR_OBC_CHARMCODE |
| | | OBC (0X505) | 100ms | 0 | 0 | CR_EVSE_MAXCUR |
| | | | | 1 | 8 | |
| | | | | 2 | 16 | CR_EVSE_MAXVOLT |
| | | | | 3 | 24 | |
| | | | | 4 | 32 | CR_EVSE_MAXPWR |
| | | | | 5 | 40 | |
| | | | | 6 | 48 | RESERVED |
| | | | | 7 | 56 | RESERVED |

FIG. 6B

| DESCRIPTON |
|---|
| RESPONSE CODE |
| EVSE PROCESSING |
| RESPONSE TO REQUEST |
| REACH MAXIMUM VALUE |
| REACH MAXIMUM VALUE |
| REACH MAXIMUM VALUE |
| ISOLATION STATE INFORMATION |
| EVSE STATUS INFORMATION |
| SUPPORABLE METHOD<br>0: AC SINGLE PHASE, 1: AC THREE PHASE, 2: DC, AND 3: DC COMBO |
| PROFILE NUMBER DEFINITION |
| READY STATE |
| WARNING STATE |
| FAULTY STATE |
| CHARGING MODE (CC,CV,CP) |
| MAXIMUM LIMITED CURRENT |
| MAXIMUM LIMITED VOLTAGE |
| MAXIMUM LIMITED POWER |

FIG. 7A

| FROM | TO | ID | TIMING | BYTE | BIT | DATA |
|------|----|----|--------|------|-----|------|
| EVSE | OBC | OBC (0X506) | 100ms | 0 | 0 | CR_EVSE_SCHMAXPWR0 |
| | | | | 1 | 8 | CR_EVSE_TIME0 |
| | | | | 2 | 16 | CR_EVSE_SCHMAXPWR1 |
| | | | | 3 | 24 | CR_EVSE_TIME1 |
| | | | | 4 | 32 | CR_EVSE_SCHMAXPWR2 |
| | | | | 5 | 40 | CR_EVSE_TIME2 |
| | | | | 6 | 48 | CR_EVSE_SCHMAXPWR3 |
| | | | | 7 | 56 | CR_EVSE_TIME3 |
| | | OBC (0X506) | 100ms | 0 | 0 | CR_EVSE_SCHMAXPWR5 |
| | | | | 1 | 8 | CR_EVSE_TIME4 |
| | | | | 2 | 16 | CR_EVSE_SCHMAXPWR6 |
| | | | | 3 | 24 | CR_EVSE_TIME6 |
| | | | | 4 | 32 | CR_EVSE_SCHMAXPWR7 |
| | | | | 5 | 40 | CR_EVSE_TIME7 |
| | | | | 6 | 48 | CR_EVSE_SCHMAXPWR8 |
| | | | | 7 | 56 | CR_EVSE_TIME8 |

FIG. 7B

| DESCRIPTON |
|---|
| SCHEDULE INFORMATION |
| SCHEDULE TIME |
| |
| |
| |
| |
| |
| |
| |
| |
| |
| |
| |
| |

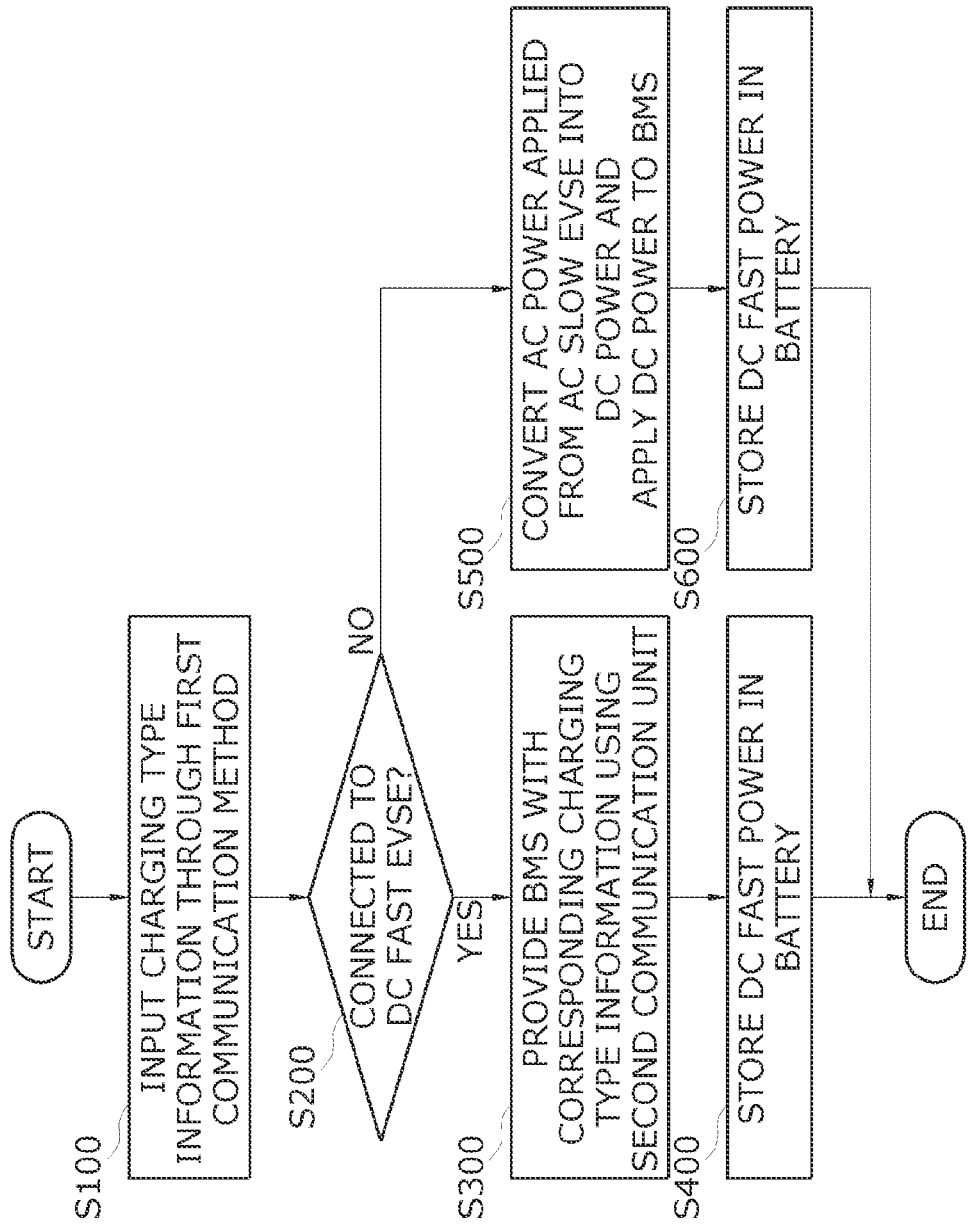

ELECTRIC VEHICLE CHARGING SYSTEM AND METHOD

CROSS-REFERENCE TO RELATED APPLICATION

This application is a continuation of U.S. patent application Ser. No. 16/791,886 filed on Feb. 14, 2020, which claims the benefit under 35 USC 119(a) application claims priority to and the benefit of Korean Patent Application No. 2019-0018257, filed on Feb. 15, 2019, the disclosures of which are incorporated herein by reference in their entirety.

BACKGROUND

1. Field of the Invention

The present invention relates to an electric vehicle charging system, and more specifically, to an electric vehicle charging system that allows direct current (DC) fast charging and alternating current (AC) slow charging of an electric vehicle by implementing a protocol for a communication interface.

2. Discussion of Related Art

In general, electric vehicle supply equipment (EVSE) is classified into direct current (DC) fast charging equipment and alternating current (AC) slow charging equipment and initiates a charging operation by interfacing with an on-board charger (OBC) through a controller area network (CAN) communication or a physical signal.

As shown in FIG. 1, a conventional DC fast electric vehicle charging system includes a DC fast EVSE 10 and an electric vehicle 20 having a battery management system (BMS) 22 for managing a battery 21 and an OBC 23.

The DC fast EVSE 10 supplies power to the electric vehicle 20 connected thereto and interfaces with the electric vehicle 20 such that DC fast charging is enabled through a CAN interface between the BMS 22 and the OBC 23.

To this end, the conventional charging method related interface information on DC fast charging is specified in IEC61851 and distributed, but the interface information is specified only for unidirectional charging.

Information about a CAN interface between a fast EVSE and a BMS of a vehicle is defined as follows.

Although the conventional charging protocol through the interface between the EVSE and the BMS is defined as shown in FIG. 2A to FIG. 2D, a new application of a combo method for AC charging and DC charging requires an additional control device and also requires an interface with external charging equipment.

SUMMARY OF THE INVENTION

The present invention provides an electric vehicle charging system capable of simultaneously satisfying unidirectional charging and bidirectional charging with protocol standards that allow a communication interface with AC slow charging equipment and DC fast charging equipment.

The technical objectives of the present invention are not limited to the above, and other objectives may become apparent to those of ordinary skill in the art based on the following description.

According to one aspect of the present invention, there is provided a charging system for an electric vehicle, including: a bidirectional charging unit provided with a first communication unit and a second communication unit, wherein, when an inlet connector of fast charging equipment or slow charging equipment is connected to the bidirectional charging unit, the first communication unit receives charging type information from the fast charging equipment or the slow charging equipment through a first communication method, the second communication unit performs communication with a battery management system (BMS) through a communication protocol, the bidirectional charging unit determines whether a connection to the fast charging equipment is established or a connection to the slow charging equipment is established using the charging type information input through the first communication unit, when it is determined that the connection to the fast charging equipment is established, the bidirectional charging unit provides the BMS with the charging type information using the second communication unit, and when it is determined that the connection to the AC slow charging equipment is established, the bidirectional charging unit converts alternating current (AC) power applied from the slow charging equipment into direct current (DC) power and applies the DC power to the BMS; and the BMS provided with a second communication unit and configured to manage a battery and store the power applied from the fast charging equipment in the battery or store DC slow power applied from the bidirectional charging unit in the battery according to the charging type information provided from the bidirectional charging unit through the second communication unit.

The fast charging equipment may include: a fast charging unit configured to supply power to the battery of the electric vehicle; the inlet connector provided with a power line for supplying DC power which is applied through the fast charging unit, and connected to an inlet of the electric vehicle; and a first communication unit configured to provide the bidirectional charging unit with the charging type information when the inlet connector is connected to the inlet of the electric vehicle.

The slow charging equipment may include: a slow charging unit configured to supply AC power to the battery of the electric vehicle; the inlet connector provided with a power line for supplying AC power, which is applied through the slow charging unit, and connected to an inlet of the electric vehicle; and a first communication unit configured to provide the bidirectional charging unit with the charging type information when the inlet connector is connected to the inlet of the electric vehicle.

The first communication unit may use a power line communication (PLC) protocol.

The second communication unit may include a controller area network (CAN) communication.

The charging type information transmitted and received between the slow charging equipment and the bidirectional charging unit may include at least one piece of information among supporting application protocol request and response information, session configuration request and response information, service search request and response information, service detail request and response information, payment service selection request and response information, payment detail information request and response information, authentication request and response information, AC charging parameter search request and response information, power detail information request and response information, charging state information request and response information, metering reception information request and response information, and session termination request and response information.

The charging type information transmitted and received between the fast charging equipment and the bidirectional charging unit may include at least one piece of information among supporting application protocol request and response information, session configuration request and response information, service search request and response information, service detail request and response information, payment service selection request and response information, payment detail information request and response information, authentication request and response information, DC charging parameter search request and response information, power detail information request and response information, charging state information request and response information, metering reception information request and response information, and session termination request and response information.

The AC charging parameter search request and response information and the DC charging parameter search request and response information transmitted from the AC slow charging equipment or the fast charging equipment to the bidirectional charging unit may include response code information, charging equipment processing information, response information regarding request, maximum voltage reach information, maximum current reach information, maximum power reach information, isolation state information, charging equipment status information, charging support method information, profile number definition information, charging equipment ready state information, charging equipment warning state information, charging equipment faulty state information, charging equipment charge mode information, charging equipment maximum limited current information, charging equipment maximum limited voltage information, and charging equipment maximum limited power information.

The AC charging parameter search request and response information and the DC charging parameter search request and response information transmitted from the bidirectional charging unit to the AC slow charging equipment or the fast charging equipment may include start procedure initiation information, start error information, state request information, ready state information, charging completion information, maximum current information, maximum voltage information, target current information, remaining time information, target state of charge (SOC) information, and SOC state information.

The charging type information transmitted and received between the bidirectional charging unit and the BMS may include state information of charging equipment (0: unidentified, 1: stable, 2: warning, and 3: faulty), input voltage type information (0: single phase, 1: three phase, 2: direct current (DC), and 3: DC combo), charge finished information, charging equipment charge finished information, charging equipment status information, maximum voltage information, maximum current information, output voltage information, and output current information.

The charging system may further include a mode selection unit configured to select a charging mode for receiving power from the AC slow charging equipment or the fast charging equipment and a supply mode for supplying power of the battery of the electric vehicle to the AC slow charging equipment or the fast charging equipment.

According to another aspect of the present invention, there is provided a method of charging an electric vehicle using a charging system, the method including: when an inlet connector of fast charging equipment or slow charging equipment connected to the charging system, receiving, by a bidirectional charging unit, charging type information from the fast charging equipment or the slow charging equipment through a first communication unit by a first communication method; determining, by the bidirectional charging unit, whether a connection to the fast charging equipment is established or a connection to the slow charging equipment is established using the charging type information input through the first communication unit; when it is determined that the connection to the fast charging equipment is established in the determining, providing, by the bidirectional charging unit, a battery management system (BMS) with the charging type information using a second communication unit; and storing, by the BMS, power applied from the fast charging equipment in a battery according to the charging type information provided from the bidirectional charging unit through the second communication unit.

The method may further include: when it is determined that the connection to the alternating current (AC) fast charging equipment is established in the determining, converting, by the bidirectional charging unit, AC power applied from the slow charging equipment into direct current (DC) power and applying the DC power to the BMS; and storing, by the BMS, DC slow power applied from the bidirectional charging unit in the battery.

The first communication unit may use a power line communication (PLC) protocol.

The second communication unit may include a controller area network (CAN) communication.

The charging type information transmitted and received between the slow charging equipment and the bidirectional charging unit may include at least one piece of information among supporting application protocol request and response information, session configuration request and response information, service search request and response information, service detail request and response information, payment service selection request and response information, payment detail information request and response information, authentication request and response information, alternating current (AC) charging parameter search request and response information, power detail information request and response information, charging state information request and response information, metering reception information request and response information, and session termination request and response information.

The charging type information transmitted and received between the fast charging equipment and the bidirectional charging unit may include at least one piece of information among supporting application protocol request and response information, session configuration request and response information, service search request and response information, service detail request and response information, payment service selection request and response information, payment detail information request and response information, authentication request and response information, direct current (DC) charging parameter search request and response information, power detail information request and response information, charging state information request and response information, metering reception information request and response information, and session termination request and response information.

The AC charging parameter search request and response information and the DC charging parameter search request and response information transmitted from the AC slow charging equipment or the fast charging equipment to the bidirectional charging unit may include response code information, charging equipment processing information, response information regarding request, maximum voltage reach information, maximum current reach information, maximum power reach information, isolation state information, charging equipment status information, charging support method information, profile number definition information, charging equipment ready state information, charging equipment warning state information, charging equipment faulty state information, charging equipment charge mode information, charging equipment maximum limited current information, charging equipment maximum limited voltage information, and charging equipment maximum limited power information.

The AC charging parameter search request and response information and the DC charging parameter search request and response information transmitted from the bidirectional charging unit to the AC slow charging equipment or the fast charging equipment may include start procedure initiation information, start error information, state request information, ready state information, charging completion information, maximum current information, maximum voltage information, target current information, remaining time information, target state of charge (SOC) information, and SOC state information.

The charging type information transmitted and received between the bidirectional charging unit and the BMS may include state information of charging equipment (0: unidentified, 1: stable, 2: warning, and 3: faulty), input voltage type information (0: single phase, 1: three phase, 2: direct current (DC), and 3: DC combo), charge finished information, charging equipment charge finished information, charging equipment status information, maximum voltage information, maximum current information, output voltage information, and output current information.

The method may further include selecting, by a mode selection unit, a charging mode for receiving power from the AC slow charging equipment or the fast charging equipment and a supply mode for supplying power of the battery of the electric vehicle to the AC slow charging equipment or the fast charging equipment.

BRIEF DESCRIPTION OF THE DRAWINGS

FIG. 2A to FIG. 2D is a reference diagram for describing a communication protocol used for an interface of a conventional DC fast charging system.

FIG. 4A and FIG. 4B is a reference diagram for describing information transmitted from a bidirectional charging unit to a battery management system (BMS) according to an embodiment of the present invention.

FIG. 5A and FIG. 5B is a reference diagram for describing information transmitted from a bidirectional charging unit to charging equipment according to an embodiment of the present invention.

FIGS. 6A-6B and FIGS. 7A-7B are reference diagrams for describing information transmitted from charging equipment to a bidirectional charging unit according to an embodiment of the present invention.

FIG. 8 is a flowchart for describing an electric vehicle charging method according to an embodiment of the present invention.

DETAILED DESCRIPTION OF EXEMPLARY EMBODIMENTS

Hereinafter, advantages and features of the present invention and manners of achieving them will become readily apparent with reference to descriptions of the following detailed embodiments when considered in conjunction with the accompanying drawings. However, the scope of the present invention is not limited to such embodiments, and the present invention may be embodied in various forms. The embodiments to be described below are embodiments provided only to complete the disclosure of the present invention and assist those skilled in the art in fully understanding the scope of the present invention. The present invention is defined only by the scope of the appended claims. Meanwhile, terms used herein are used to aid in the explanation and understanding of the present invention and are not intended to limit the scope and spirit of the present invention. It should be understood that the singular forms "a," "an," and "the" also include the plural forms unless the context clearly dictates otherwise. The terms "comprises," "comprising," "includes," and/or "including," when used herein, specify the presence of stated features, integers, steps, operations, elements, components and/or groups thereof, and do not preclude the presence or addition of one or more other features, integers, steps, operations, elements, components, and/or groups thereof.

Figure 1:
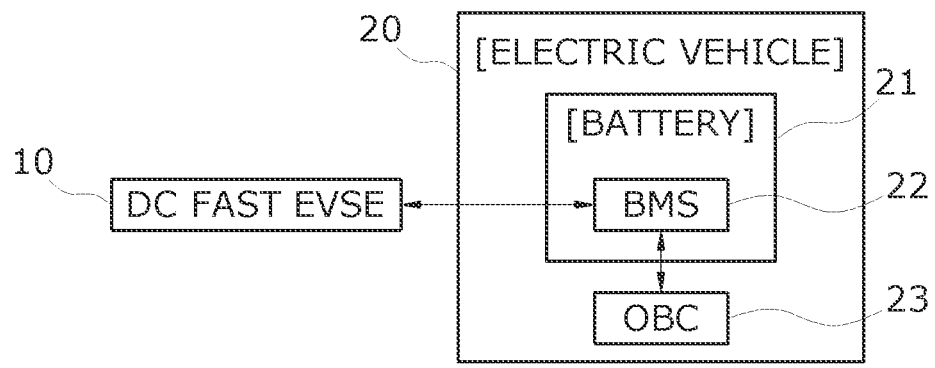
FIG. 1 is a block diagram illustrating a conventional direct current (DC) fast charging system.
Figure 3:
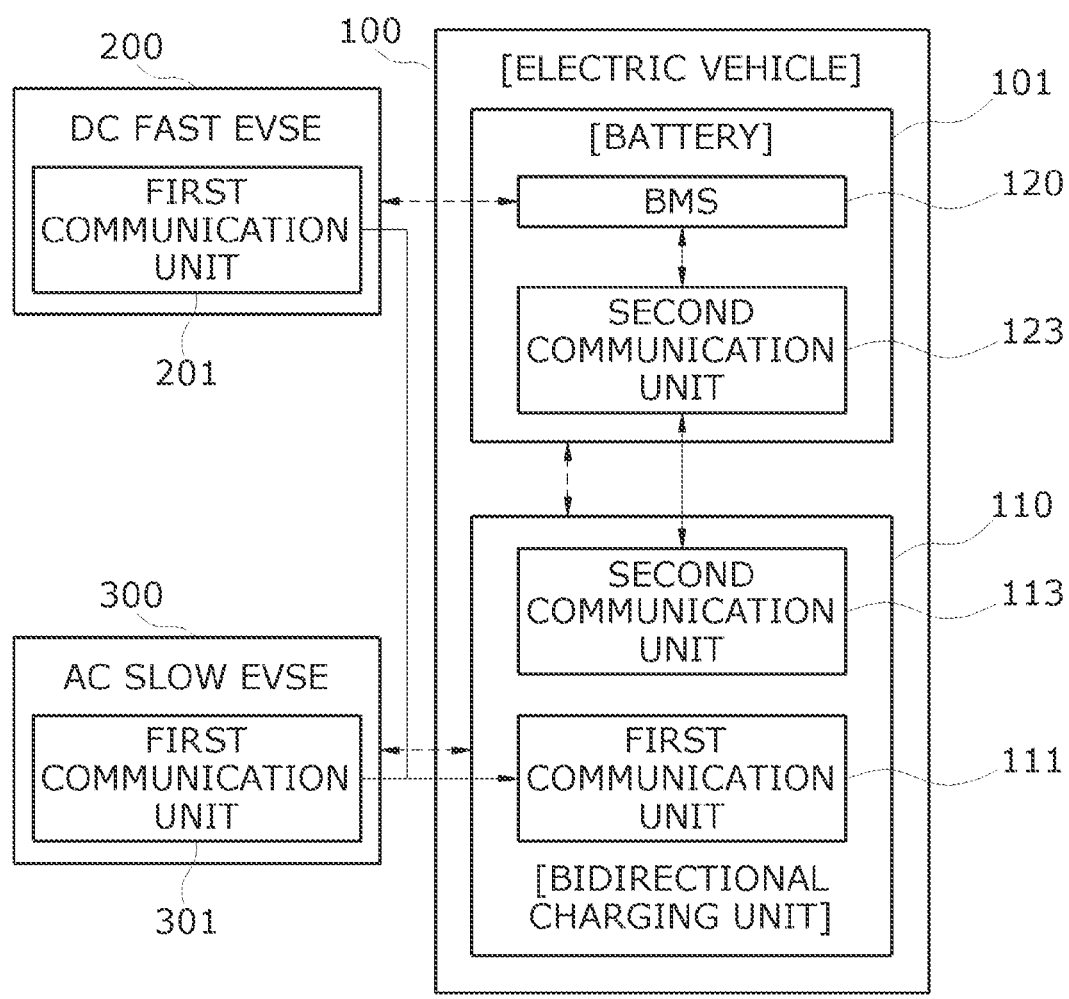
FIG. 3 is a block diagram for describing an electric vehicle charging system according to an embodiment of the present invention.

Hereinafter, exemplary embodiments of the present invention will be described in detail with reference to the accompanying drawings. FIG. 3 is a block diagram for describing an electric vehicle charging system according to an embodiment of the present invention.

Referring to FIG. 3, the electric vehicle charging system according to the embodiment of the present invention includes an electric vehicle 100 including a bidirectional charging unit 110 and a battery management system (BMS) 120, direct current (DC) fast charging equipment 200, and alternating current (AC) slow charging equipment 300.

The bidirectional charging unit 110 may be provided with a first communication unit 111 configured to receive charging type information from the DC fast charging equipment 200 or the AC slow charging equipment 300 through a first communication method and a second communication unit 113 configured to perform communication with the BMS 120 through a communication protocol. In the embodiment of the present invention, the charging type information transmitted and received between the AC slow charging equipment 300 and the bidirectional charging unit 110 includes at least one piece of information among supporting application protocol request and response information, session configuration request and response information, service search request and response information, service detail request and response information, payment service selection request and response information, payment detail information request and response information, authentication request and response information, AC charging parameter search request and response information, power detail information request and response information, charging state information request and response information, metering reception information request and response information, and session termination request and response information.

On the contrary, in the embodiment of the present invention, the charging type information transmitted and received between the DC fast charging equipment 200 and the bidirectional charging unit 110 includes at least one piece of information among supporting application protocol request and response information, session configuration request and response information, service search request and response information, service detail request and response information, payment service selection request and response information, payment detail information request and response information, authentication request and response information, DC charging parameter search request and response information, power detail information request and response information, charging state information request and response information, metering reception information request and response information, and session termination request and response information.

Meanwhile, the first communication unit 111 according to the embodiment of the present invention may use a power line communication (PLC) protocol.

In addition, the second communication unit 113 according to the embodiment of the present invention is illustrated as using a controller area network (CAN) communication, but the communication method thereof is not limited thereto.

When an inlet connector (not shown) of the DC fast charging equipment 200 or the AC slow charging equipment 300 is connected thereto, the bidirectional charging unit 110 determines whether a connection to the DC fast charging equipment 200 is established or a connection to the AC slow charging equipment 300 is established using the charging type information input through the first communication unit 111.

When it is determined that the connection to the DC fast charging equipment 200 is established, the bidirectional charging unit 110 provides the BMS 120 with the charging type information using the second communication unit 113.

On the other hand, when it is determined that the connection to the AC slow charging equipment is established, the bidirectional charging unit 110 converts AC power applied from the AC slow charging equipment 300 into DC power and applies the DC power to the BMS 120.

The BMS 120 is provided with a second communication unit 123 and is configured to manage a battery 101 and store the power applied from the DC fast charging equipment 200 in the battery 101 or store DC slow power applied from the bidirectional charging unit 110 in the battery 101 according to the charging type information provided from the bidirectional charging unit 110 through the second communication unit 123.

Meanwhile, the charging type information transmitted and received between the bidirectional charging unit 110 and the BMS 120 includes state information of charging equipment (0: unidentified, 1: stable, 2: warning, and 3: faulty), input voltage type information (0: single phase, 1: three phase, 2: DC, and 3: DC combo), charge finished information, charging equipment charge finished information, charging equipment status information, maximum voltage information, maximum current information, output voltage information, and output current information as shown in FIG. 4A and FIG. 4B.

Therefore, according to the embodiment of the present invention, when the electric vehicle is connected to the AC slow charging equipment or the DC fast charging equipment for charging, the DC fast charging or AC slow charging may be supported through the charging type information provided from the connected charging equipment.

Meanwhile, the DC fast charge equipment 200 according to the embodiment of the present invention is provided with a fast charging unit and an inlet connector, which are not shown in the drawing, and includes a first communication unit 201.

The fast charging unit serves to supply power to the battery 101 of the electric vehicle 100.

The inlet connector is provided with a power line for supplying DC power that is applied through the fast charging unit and is connected to an inlet of the electric vehicle 100.

In addition, the first communication unit 201 serves to provide the first communication unit 111 of the bidirectional charging unit 110 with the charging type information when the inlet connector is connected to the inlet of the electric vehicle 100.

The AC slow charging equipment 300 according to the embodiment of the present invention is provided with a slow charging unit and an inlet connector, which are not shown in the drawing, and includes a first communication unit 301.

The slow charging unit serves to supply AC power to the battery 101 of the electric vehicle 100.

The inlet connector is provided with a power line for supplying AC power that is applied through the slow charging unit and is connected to the inlet of the electric vehicle 100.

In addition, the first communication unit 301 serves to provide the first communication unit 111 of the bidirectional charging unit 110 with the charging type information when the inlet connector is connected to the inlet of the electric vehicle 100.

Meanwhile, the AC charging parameter search request and response information and the DC charging parameter search request and response information transmitted from the bidirectional charging unit 110 to the DC fast charging equipment 200 or the AC slow charging equipment 300 may include start procedure initiation information, start error information, state request information, ready state information, charging completion information, maximum current information, maximum voltage information, target current information, remaining time information, target state of charge (SOC) information, and SOC state information as shown in FIG. 5A and FIG. 5B.

Figure 7B:
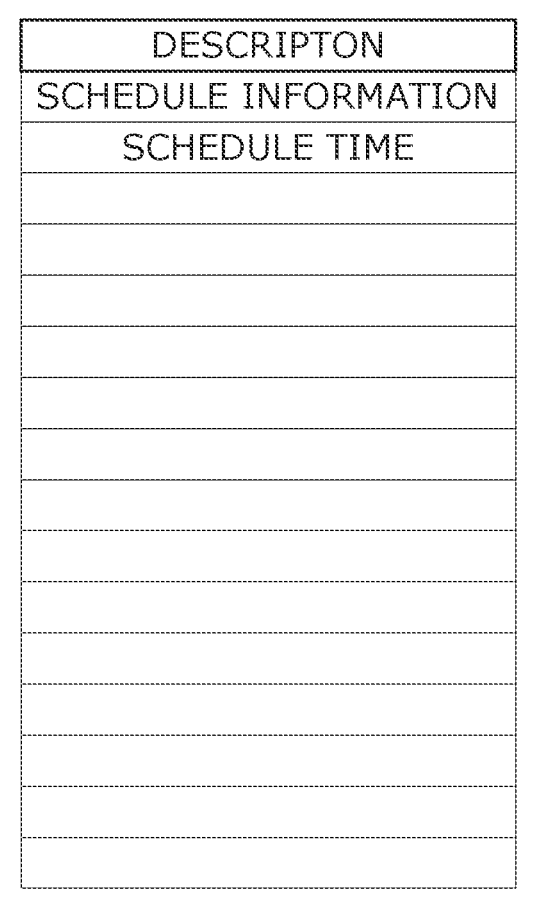

In addition, the AC charging parameter search request and response information and the DC charging parameter search request and response information transmitted from the DC fast charging equipment 200 or the AC slow charging equipment 300 to the bidirectional charging unit 110 may include response code information, charging equipment processing information, response information regarding request, maximum voltage reach information, maximum current reach information, maximum power reach information, isolation state information, charging equipment status information, charging support method information, profile number definition information, charging equipment ready state information, charging equipment warning state information, charging equipment faulty state information, charging equipment charge mode information, charging equipment maximum limited current information, charging equipment maximum limited voltage information, and charging equipment maximum limited power information as shown in FIGS. 6A and 6B and may further include schedule information and schedule time information as shown in FIGS. 7A and 7B.

Hereinafter, a method of charging an electric vehicle according to an embodiment of the present invention will be described with reference to FIG. 8.

First, the method of charging the electric vehicle 100 according to the embodiment of the present invention is preferably performed by each component of the electric vehicle 100.

First, when the bidirectional charging unit 110 is physically connected to the inlet connector of the DC fast charging equipment 200 or the AC slow charging equipment 300, the bidirectional charging unit 110 receives charging type information from the first communication unit 201 of the DC fast charging equipment 200 or the first communication unit 301 of the AC slow charging equipment 300 through the first communication unit 111 (S100). Here, the first communication units 111, 201, and 203 may preferably use a PLC protocol.

Then, the bidirectional charging unit 110 determines whether a connection to the DC fast charging equipment 200 is established or a connection to the AC slow charging equipment 300 is established using the charging type information input through the first communication unit 111 (S200).

When it is determined in the determination operation S200 that the connection to the DC fast charging equipment 200 is established (YES in operation S200), the bidirectional charging unit 110 provides the second communication unit 123 of the BMS 120 with the charging type information using the second communication unit 113 (S300). The second communication units 113 and 123 may preferably include a CAN communication, but the communication method is not limited thereto.

Then, the BMS 120 stores the power applied from the DC fast charging equipment 200 in the battery 101 according to the charging type information provided from the bidirectional charging unit 110 through the second communication unit 123 (S400).

When it is determined in the determination operation S200 that the connection to the AC slow charging equipment is established (NO in operation S200), the bidirectional charging unit 110 converts AC power applied from the AC slow charging equipment 300 into DC power and applies the DC power to the BMS 120 (S500).

Then, the BMS 120 stores the DC slow power applied from the bidirectional charging unit 110 in the battery 101 (S600).

Here the charging type information transmitted and received between the AC slow charging equipment 300 and the bidirectional charging unit 110 includes at least one piece of information among supporting application protocol request and response information, session configuration request and response information, service search request and response information, service detail request and response information, payment service selection request and response information, payment detail information request and response information, authentication request and response information, AC charging parameter search request and response information, power detail information request and response information, charging state information request and response information, metering reception information request and response information, and session termination request and response information.

In addition, the charging type information transmitted and received between the bidirectional charging unit 110 and the BMS 120 includes state information of charging equipment (0: unidentified, 1: stable, 2: warning, and 3: faulty), input voltage type information (0: single phase, 1: three phase, 2: DC, and 3: DC combo), charge finished information, charging equipment charge finished information, charging equipment status information, maximum voltage information, maximum current information, output voltage information, and output current information as shown in FIG. 4A and FIG. 4B.

In addition, the AC charging parameter search request and response information and the DC charging parameter search request and response information transmitted from the bidirectional charging unit 110 to the AC slow charging equipment or the DC fast charging equipment 200 include start procedure initiation information, start error information, state request information, ready state information, charging completion information, maximum current information, maximum voltage information, target current information, remaining time information, target SOC information, and SOC state information as shown in FIG. 5A and FIG. 5B.

Meanwhile, the AC charging parameter search request and response information and the DC charging parameter search request and response information transmitted from the bidirectional charging unit 110 to the DC fast charging equipment 200 or to the AC slow charging equipment 300 include start procedure initiation information, start error information, state request information, ready state information, charging completion information, maximum current information, maximum voltage information, target current information, remaining time information, target SOC information, and SOC state information as shown in FIG. 5A and FIG. 5B.

In addition, the AC charging parameter search request and response information and the DC charging parameter search request and response information transmitted from the DC fast charging equipment 200 or the AC slow charging equipment 300 to the bidirectional charging unit 110 include response code information, charging equipment processing information, response information regarding request, maximum voltage reach information, maximum current reach information, maximum power reach information, isolation state information, charging equipment status information, charging support method information, profile number definition information, charging equipment ready state information, charging equipment warning state information, charging equipment faulty state information, charging equipment charge mode information, charging equipment maximum limited current information, charging equipment maximum limited voltage information, and charging equipment maximum limited power information as shown in FIGS. 6A and 6B and may further include schedule information and schedule time information as shown in FIGS. 7A and 7B.

According to another embodiment of the present invention, the charging system for the electric vehicle may further include a mode selection unit 500 configured to select a charging mode for receiving power from the AC slow charging equipment or the DC fast charging equipment 200 and a supply mode for supplying power of the battery 101 of the electric vehicle 100 to the AC slow charging equipment or the DC fast charging equipment 200.

As is apparent from the above, when an electric vehicle is connected to either AC slow charging equipment or DC fast charging equipment, DC fast charging or AC slow charging can be supported through charging type information provided from the connected charging equipment.

Although the present invention has been described by the exemplary embodiments with reference to the accompanying drawings, it will be apparent to those skilled in the art that various modifications can be made to the above-described exemplary embodiments of the present invention without departing from the spirit or scope of the invention. Therefore, the scope of the present invention is not defined by the above embodiments but by the appended claims of the present invention.

What is claimed is:

1. An electric vehicle charging system comprising:
  a combo inlet configured to support a connection between a connector and fast charging equipment, and a connection between the connector and slow charging equipment;
  a charger configured to determine which of the fast charging equipment and the slow charging equipment is connected to the combo inlet, based on charging type information received through the connector;

a battery charged with power applied from one, dependent on a result of the determination, of the fast charging equipment and the slow charging equipment; and a mode selection unit configured to select a supply mode for supplying the power charged into the battery to a select one, dependent on the result of the determination, of the fast charging equipment and the slow charging equipment, wherein the charging type information transmitted and received between the slow charging equipment and the charger comprises at least on piece of information among supporting application protocol request and response information, session configuration request and response information, service search request and response information, service detail request and response information, payment service selection request and response information, payment detail information request and response information, authentication request and response information, alternating current (AC) charging parameter search request and response information, power detail information request and response information, charging state information request and response information, metering reception information request and response information, and session termination request and response information.

2. The electric vehicle charging system of claim 1, wherein the battery supplies the power charged into the battery to the select one of the fast charging equipment and the slow charging equipment based on the selected supply mode.

3. The electric vehicle charging system of claim 1, wherein the charging type information transmitted and received between the fast charging equipment and the charger comprises at least one piece of information among supporting application protocol request and response information, session configuration request and response information, service search request and response information, service detail request and response information, payment service selection request and response information, payment detail information request and response information, authentication request and response information, direct current (DC) charging parameter search request and response information, power detail information request and response information, charging state information request and response information, metering reception information request and response information, and session termination request and response information.

4. The electric vehicle charging system of claim 1, wherein information exchanged between the charger and the battery comprises at least one of state information of charging equipment, input voltage type information, charge finished information, charging equipment charge finished information, charging equipment status information, maximum voltage information, maximum current information, output voltage information, and output current information.

* * * * *